(12) United States Patent
Naslund et al.

(10) Patent No.: US 10,012,668 B1
(45) Date of Patent: Jul. 3, 2018

(54) TRIPLE-REDUNDANT AIR DATA SYSTEM ARCHITECTURE

(71) Applicant: Rosemount Aerospace Inc., Burnsville, MN (US)

(72) Inventors: Brian Brent Naslund, Chanhassen, MN (US); Jaime Sly, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/374,457

(22) Filed: Dec. 9, 2016

(51) Int. Cl.
- *G01P 5/165* (2006.01)
- *G01P 13/02* (2006.01)
- *B64D 43/00* (2006.01)

(52) U.S. Cl.
CPC ............ *G01P 5/165* (2013.01); *B64D 43/00* (2013.01); *G01P 13/025* (2013.01)

(58) Field of Classification Search
CPC ........ G01P 5/165; G01P 13/025; B64D 43/00
See application file for complete search history.

(56) References Cited

U.S. PATENT DOCUMENTS

| | | |
|---|---|---|
| 6,604,029 B2 | 8/2003 | Cronin et al. |
| 6,668,640 B1 | 12/2003 | Alwin et al. |
| 8,365,591 B2 | 2/2013 | Golly |
| 2014/0180503 A1 | 6/2014 | Colliau et al. |
| 2015/0012155 A1* | 1/2015 | Mandle ................ G01C 21/005 701/14 |
| 2016/0180611 A1 | 6/2016 | Cadotte et al. |

FOREIGN PATENT DOCUMENTS

| | | |
|---|---|---|
| EP | 1391736 A1 | 2/2004 |
| EP | 2923949 A1 | 9/2015 |
| EP | 3081945 A1 | 10/2016 |

OTHER PUBLICATIONS

Hagen, Floyd W., et al: "Deutsche airbus flight test of Rosemount smart probe for distribted air data systems", Digital Avionics Systems Conference, 1993. 12th DASC., AIAA/IEEE Fort Worth, TX, USA, 25-28 Oct. 1, New York, NY, USA, IEEE, US Oct. 25, 1993, pp. 110-117.
Extended European Search Report for European Patent Application No. 17206457.8, dated Feb. 22, 2018, 8 pages.

* cited by examiner

*Primary Examiner* — Todd Melton
(74) *Attorney, Agent, or Firm* — Kinney & Lange, P.A.

(57) ABSTRACT

A first air data system for providing first aircraft air data parameter outputs is formed by a first electronics channel of a first multi-function probe (MFP) that is electrically coupled with a first static pressure sensor. A second air data system for providing second aircraft air data parameter outputs is formed by a first electronics channel of a second MFP that is electrically coupled with a second static pressure sensor. A third air data system for providing third aircraft air data parameter outputs is formed by a second electronics channel of the first MFP that is electrically coupled with a second electronics channel of the first MFP.

20 Claims, 3 Drawing Sheets

TRIPLE-REDUNDANT AIR DATA SYSTEM ARCHITECTURE

BACKGROUND

The present disclosure relates generally to air data systems, and more particularly to air data systems utilizing multi-function probes and static pressure ports for generating aircraft air data parameters.

Modern aircraft often incorporate air data systems that calculate air data outputs based on measured parameters collected from various sensors positioned about the aircraft. For instance, many air data systems utilize air data probes that measure pneumatic pressure of oncoming airflow about the aircraft exterior to generate aircraft air data outputs, such as angle of attack (i.e., an angle between the oncoming airflow or relative wind and a reference line of the aircraft, such as a chord of a wing of the aircraft), calibrated airspeed, Mach number, altitude, or other air data parameters. During sideslip of the aircraft (i.e., a nonzero angle between the direction of travel of the aircraft and the aircraft centerline extending through the nose of the aircraft), compensation of various local (to the probe) parameters or signals, such as angle of attack and static pressure, is advantageous for accurate determination of aircraft air data parameters, such as aircraft angle of attack or aircraft pressure altitude (determined from static pressure measurements).

Increased accuracy achieved through sideslip compensation is particularly relevant when the aircraft operates in Reduced Vertical Separation Minimum (RVSM) space areas of air traffic control systems. To this end, many air data systems utilize multiple pneumatic air data probes positioned at opposite sides of the aircraft and cross-coupled to exchange pressure information. Static pressure sensed by an opposite side probe is used to compensate air data parameter outputs for a sideslip condition. In certain air data systems, cross-coupled probes are pneumatically connected so that the pressure signals are averaged between probes. Other air data systems utilize air data probes that are not pneumatically connected, but rather include processors and other electronic components for interchanging electrical signals representative of the pressure information (and other information) between probes. Such probes, having integrated electronics, are often referred to as electronic multi-function probes (MFPs). MFPs reduce the need for pneumatic couplings between the probes, thereby reducing space, cost, and maintenance associated with the pneumatic couplings.

As aircraft systems such as flight control systems and stall protection systems become more highly integrated, complex, and automated, the integrity of air data information used by these aircraft systems becomes increasingly important. As such, these highly complex systems typically utilize redundant inputs of air data information that are measured by independent sources. The independent sources of air data are often desired to be derived from dissimilar equipment to reduce the risk of common mode errors occurring amongst the separate sources of air data. This redundancy, independence, and dissimilarity of air data outputs is strongly recommended by certification authorities in the United States and Europe, among others. Indeed, adherence to one of varying levels of redundancy, independence, and dissimilarity requirements is typically required for airworthiness certification of the aircraft, the level of requirement often determined by, e.g., the type of aircraft and the complexity of the systems consuming the air data. Accordingly, certain aircraft air data systems can benefit from an air data system architecture that provides a high level of availability of air data parameters from independent and dissimilar sources, but without the increased cost, space, and weight of three, four, or more electronic MFPs.

SUMMARY

In one example, a system includes a first multi-function probe (MFP) comprising a first plurality of pressure sensing ports for sensing pressure of an oncoming airflow about an aircraft exterior, a first static pressure sensor configured to sense static pressure of the oncoming airflow about the aircraft exterior, a second MFP comprising a second plurality of pressure sensing ports for sensing pressure of the oncoming airflow about the aircraft exterior, and a second static pressure sensor configured to sense the static pressure of the oncoming airflow about the aircraft exterior. The first MFP has a first electronics channel and a second electronics channel. The first static pressure sensor is electrically coupled with the first electronics channel of the first MFP to form a first air data system providing first aircraft air data parameter outputs. The second MFP has a first electronics channel and a second electronics channel. The second static pressure sensor is electrically coupled with the first electronics channel of the second MFP to form a second air data system providing second aircraft air data parameter outputs. The second electronics channel of the first MFP is electrically coupled with the second electronics channel of the second MFP to form a third air data system providing third aircraft air data parameter outputs.

In another example, a system includes a first air data system configured to provide first aircraft air data parameter outputs, a second air data system configured to provide second aircraft air data parameter outputs, and a third air data system configured to provide third aircraft air data parameter outputs. The first air data system includes a first electronics channel of a first multi-function probe (MFP) having a first plurality of pressure sensing ports for sensing pressure of an oncoming airflow about an aircraft exterior. The first air data system further includes a first flush static pressure sensor configured to be mounted parallel to the aircraft exterior to sense static pressure of the oncoming airflow about the aircraft exterior. The second air data system includes a first electronics channel of a second MFP having a second plurality of pressure sensing ports for sensing pressure of the oncoming airflow about the aircraft exterior. The second air data system further includes a second flush static pressure sensor configured to be mounted parallel to the aircraft exterior to sense the static pressure of the oncoming airflow about the aircraft exterior. The third air data system includes a second electronics channel of the first MFP and a second electronics channel of the second MFP.

In another example, a method includes generating first air data parameter outputs from a first electronics channel of a first multi-function probe (MFP) based on pressure of an oncoming airflow about an aircraft exterior sensed by the first MFP and a first static pressure sensor. The method further includes generating second air data parameter outputs from a first electronics channel of a second MFP based on pressure of the oncoming airflow about the aircraft exterior sensed by the second MFP and a second static pressure sensor. The method further includes generating third air data parameter outputs from a second electronics channel of the first MFP based on pressure of the oncoming airflow about the aircraft exterior sensed by the first MFP and the second MFP.

DETAILED DESCRIPTION

As described herein, an air data system architecture includes two dual-channel multi-function probes (MFPs) and two static pressure sensors (e.g., flush static pressure sensors or other integrated static pressure ports) that are digitally interconnected to form three independent air data systems providing three sets of air data parameter outputs that are compensated for aircraft sideslip conditions. Because integrated static pressure sensors are typically smaller and less expensive than MFPs, the use of static pressure sensors rather than MFPs to provide static pressure data for sideslip compensation can reduce the cost, weight, and space of the air data system components (as compared with architectures utilizing three or more MFPs for data redundancy, independence, and dissimilarity). Moreover, availability of air data parameter outputs is further enhanced by an optional reversionary mode of the two dual-channel MFPs. As such, an air data system architecture as described herein can help to decrease the cost, weight, and space required for three or more air data systems.

Figure 1:
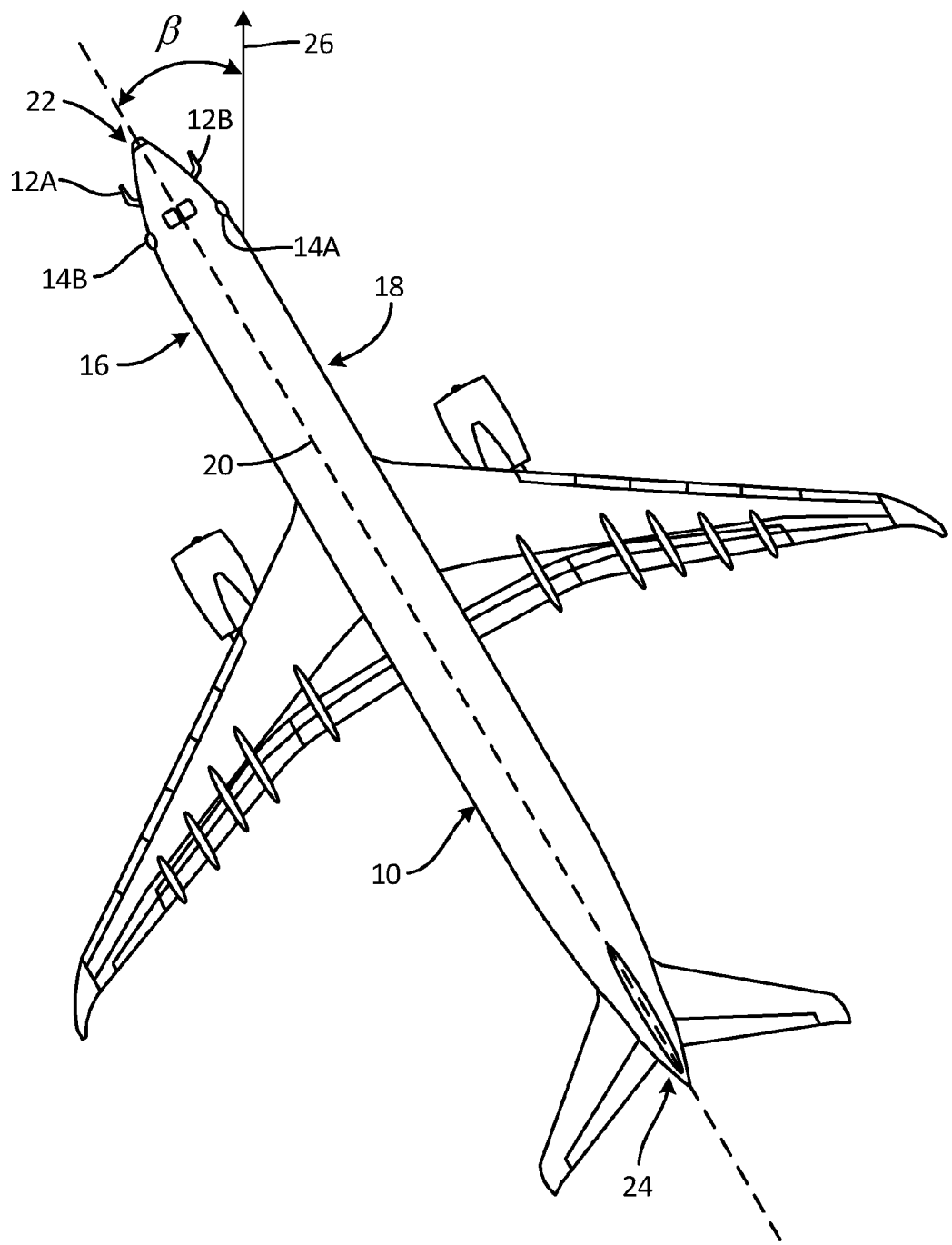
FIG. 1 is a top plan view of an aircraft in a sideslip condition and including first and second multi-function probes and first and second static pressure sensors.

FIG. 1 is a top plan view of aircraft 10 in a sideslip condition, aircraft 10 including first multi-function probe (MFP) 12A, second MFP 12B, first static pressure sensor 14A, and second static pressure sensor 14B. As illustrated, aircraft 10 includes first side 16 (or left side) and second side 18 (or right side) that is opposite first side 16 and separated by central plane 20 that extends from nose 22 to tail 24 orthogonal to a plane extending through the wings of aircraft 10. First MFP 12A and second static pressure sensor 14B are disposed at first side 16. Second MFP 12B and first static pressure sensor 14A are disposed at second side 18.

First MFP 12A and second MFP 12B are air data sensing probes having a barrel portion configured to extend into an oncoming airflow about the exterior of aircraft 10. Each barrel portion includes a plurality of pressure sensing ports including at least a total pressure sensing port at a tip of the barrel portion and alpha pressure sensing ports disposed at a top and bottom of the barrel portion for use in sensing angle of attack and static pressure of the oncoming airflow, as is further described below. Static pressure sensors 14A and 14B are flush static pressure sensors configured to be mounted parallel to the exterior of aircraft 10 or other pressure sensors including integrated static pressure ports.

Each of first MFP 12A and second MFP 12B include two (or more) electronics channels that are electrically connected with each other and with one of static pressure sensors 14A and 14B to form three independent air data systems. For example, as is further described below, a first air data system for providing first air data parameter outputs includes a first electronics channel of first MFP 12A that is electrically connected with first static pressure sensor 14A to receive static pressure data corresponding to static pressure of the oncoming airflow sensed by first static pressure sensor 14A. A second air data system for providing second air data parameter outputs includes a first electronics channel of second MFP 12B that is electrically connected with second static pressure sensor 14B to receive static pressure data corresponding to static pressure of the oncoming airflow sensed by second static pressure sensor 14B. A third air data system for providing third air data parameter outputs includes a second electronics channels of first MFP 12A and a second electronics channel of second MFP 12B that are electrically interconnected to send and receive static pressure data (or other data) between first MFP 12A and second MFP 12B.

In the example of FIG. 1, aircraft 10 is illustrated in a sideslip condition where the path of travel of aircraft 10 is indicated at 26, and angle β between travel path 26 and central plane 20 is the angle of sideslip of aircraft 10. In operation, as air flows over the exterior of aircraft 10, first MFP 12A and second MFP 12B generate local air data parameters (i.e., corresponding to the local conditions of the respective one of first MFP 12A and second MFP 12B) based on sensed pressure data, as is further described below. Static pressure sensors 14A and 14B sense static pressure of the oncoming airflow experienced at each of static pressure sensors 14A and 14B.

In a sideslip condition, first MFP 12A and second static pressure sensor 14B experience different flow conditions than those experienced by second MFP 12B and first static pressure sensor 14A. For instance, in the sideslip condition having sideslip angle β illustrated in FIG. 1, second MFP 12B and first static pressure sensor 14A experience airflow having higher pressure conditions than those experienced by first MFP 12A and second static pressure sensor 14B due to the acceleration of the airflow about the aircraft exterior prior to reaching first MFP 12A and second static pressure sensor 14B. Accordingly, a first electronics channel of first MFP 12A is electrically connected to first static pressure sensor 14A to receive static pressure data corresponding to static pressure of the oncoming airflow sensed by first static pressure sensor 14A. The first electronics channel of first MFP 12A determines an angle of sideslip of aircraft 10 as a function of the static pressure data received from first static pressure sensor 14A and compensates (e.g., modifies) the determined local air data parameters based on the determined angle of sideslip, thereby forming a first air data system that provides first air data parameter outputs that are compensated for aircraft angle of sideslip conditions. Similarly, a first electronics channel of second MFP 12B is electrically connected to second static pressure sensor 14B to receive static pressure data corresponding to static pressure of the oncoming airflow sensed by second static pressure sensor 14B. The first electronics channel of second MFP 12B determines an angle of sideslip of aircraft 10 as a function of the static pressure data received from second static pressure sensor 14B and compensates the determined local air data parameters based on the determined angle of sideslip, thereby forming a second air data system that provides second air data parameter outputs that are compensated for aircraft angle of sideslip conditions.

A second electronics channel of first MFP 12A and a second electronics channel of second MFP 12B are electrically interconnected to send and receive static pressure data. In some examples, the second electronics channel of first MFP 12A receives static pressure data from the second electronics channel of second MFP 12B corresponding to static pressure sensed by second MFP 12B. The second electronics channel of first MFP 12A determines an angle of sideslip of aircraft 10 as a function of the received static pressure data from the second electronics channel of second MFP 12B, and compensates the determined local air data parameters based on the determined angle of sideslip. In other examples, the second electronics channel of second MFP 12B receives static pressure data from the second electronics channel of first MFP 12A corresponding to static pressure sensed by first MFP 12A. The second electronics channel of second MFP 12B determines an angle of sideslip of aircraft 10 as a function of the received static pressure data from the second electronics channel of first MFP 12A, and compensates the determined local air data parameters based on the determined angle of sideslip.

Accordingly, an air data system architecture implementing techniques described herein provides three independent air data systems formed by two dual-channel MFPs and two static pressure sensors. The use of static pressure sensors 14A and 14B, rather than additional MFPs, can help to reduce the cost, weight, and space of the air data system components to provide three independent air data systems. Moreover, the use of static pressure sensors 14A and 14B can help to reduce the likelihood of common mode failures between MFPs 12A and 12B and the source of opposite side static pressure (as compared with architectures utilizing cross-coupled MFPs), thereby increasing system dissimilarity and overall reliability.

Figure 2:
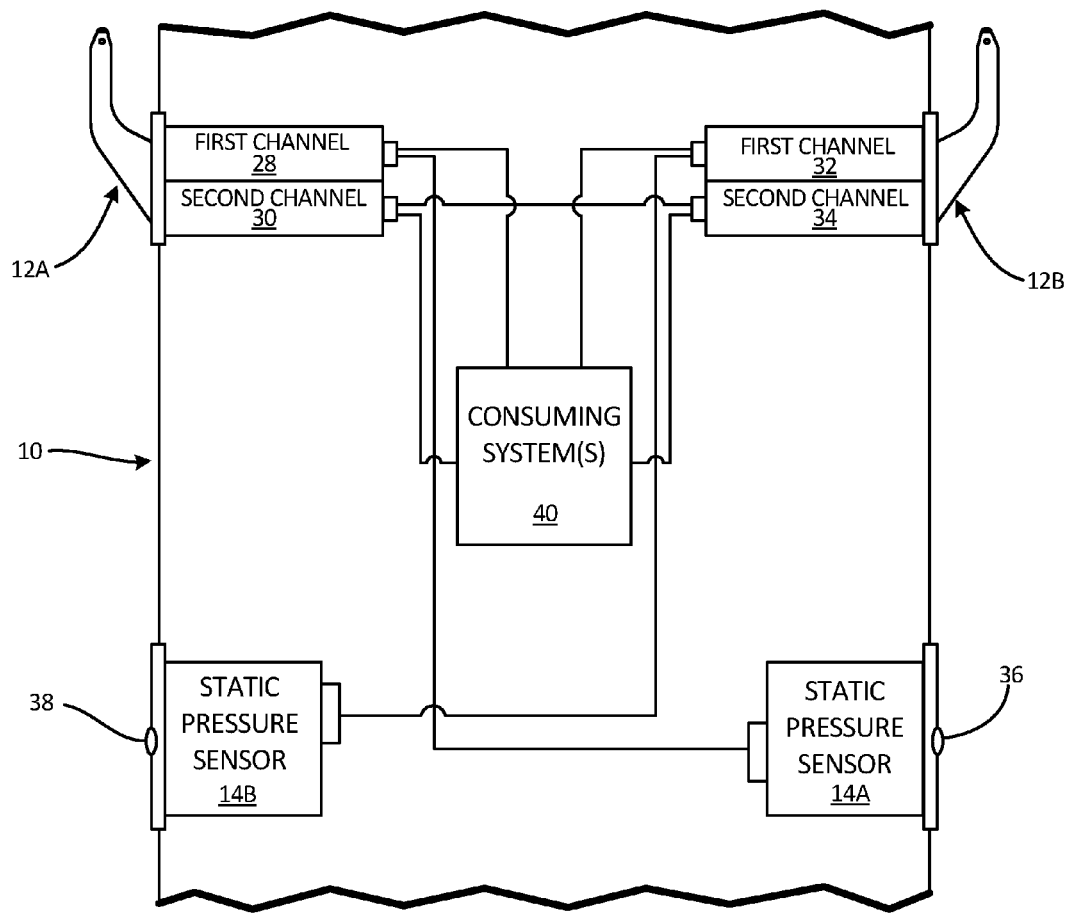
FIG. 2 is a schematic block diagram illustrating an example air data system architecture including the two multi-function probes and the two static pressure sensors interconnected and in communication with consuming systems.

FIG. 2 is a schematic block diagram illustrating an air data system architecture including first MFP 12A, second MFP 12B, first static pressure sensor 14A, and second static pressure sensor 14B. First MFP 12A includes first electronics channel 28 and second electronics channel 30. Second MFP 12B includes first electronics channel 32 and second electronics channel 34. First static pressure sensor 14A includes static pressure port 36, at least one pressure sensor, and processing circuitry for sensing and communicating data representative of a measured static pressure of an oncoming airflow about the exterior of aircraft 10. Second static pressure sensor 14B includes static pressure port 38, at least one pressure sensor, and processing circuitry for sensing and communicating data representative of a measured static pressure of the oncoming airflow. Each of first electronics channel 28, second electronics channel 30, first electronics channel 32, and second electronics channel 34 include a plurality of pressure sensors and processing circuitry for determining air data parameters based on measured pressures of the oncoming airflow, as is further described below.

As illustrated in FIG. 2A, first electronics channel 28 of first MFP 12A is electrically coupled with first static pressure sensor 14A to form a first air data system that provides first air data parameter outputs. First electronics channel 32 of second MFP 12B is electrically coupled with second static pressure sensor 14B to form a second air data system that provides second air data parameter outputs. Second electronics channel 30 of first MFP 12A and second electronics channel 34 of second MFP 12B are electrically coupled to send and receive data, such as pressure data corresponding to measured static pressures, to form a third air data system that provides third air data parameter outputs.

Each of first electronics channel 28, second electronics channel 30, first electronics channel 32, and second electronics channel 34 are electrically coupled to send and receive data with consuming system(s) 40. Consuming systems 40 can include aircraft systems, such as flight management systems, auto-flight control systems, display systems, data concentrator units, or other consuming systems of air data parameters outputs. Electrical couplings illustrated in FIG. 2 can take the form of direct electrical couplings and/or data bus couplings configured to communicate according to one or more communication protocols, such as the Aeronautical Radio, Incorporated (ARINC) 429 communication protocol, controller area network (CAN) bus communication protocol, military standard 1553 (MIL-STD-1553) communication protocol, or other analog or digital communication protocols.

In operation, each of first electronics channel 28 and second electronics channel 30 measures pressure of an oncoming airflow via a plurality of pressure sensing ports of first MFP 12A. First electronics channel 28 generates local air data parameters (i.e., local to first MFP 12A) based on the measured pressures. Examples of local air data parameters include, but are not limited to, local angle of attack, local static pressure, local calibrated airspeed, local Mach number, and local pressure altitude.

Static pressure data corresponding to static pressure measured by first static pressure sensor 14A is communicated to first electronics channel 28 of first MFP 12A. First electronics channel 28 compensates (e.g., modifies) the generated local air data parameters based on functional relationships between static pressure data received from static pressure sensor 14A and the generated local air data parameters to generate compensated aircraft air data parameters. For example, first electronics channel 28 can store one or more functional mappings that relate local air data parameter values to aircraft air data parameter values as a function of static pressure data received from first static pressure sensor 14A. Functional mappings can take the form of one or more mathematical relationships, one or more data lookup tables, or other functional mappings. First electronics channel 28 can compensate the generated local air data parameters according to the functional mappings to generate compensated aircraft air data parameter values that are provided to consuming systems 40.

In other examples, the one or more functional mappings can relate local air data parameters to aircraft air data parameter values as a function of aircraft angle of sideslip. In such examples, first electronics channel 28 can determine an aircraft angle of sideslip as a function of local total pressure, local static pressure, and local impact pressure (determined from measured pressures of first MFP 12A) as well as static pressure data received from static pressure sensor 14A. First electronics channel 28 can compensate the generated local air data parameter values based on the determined aircraft angle of sideslip according to the functional mappings to generate compensated aircraft air data parameter outputs that are provided to consuming systems 40. Aircraft air data parameter outputs can include, e.g., aircraft static pressure, aircraft calculated airspeed, aircraft Mach number, aircraft pressure altitude, aircraft angle of attack, aircraft angle of sideslip, or other aircraft air data parameters outputs.

Accordingly, first electronics channel 28 that is electrically coupled with first static pressure sensor 14A forms a first air data system that provides first aircraft air data parameter outputs to consuming systems 40. Similarly, first electronics channel 32 of second MFP 12B that is electrically coupled with second static pressure sensor 14B forms a second air data system that provides second aircraft air data parameter outputs to consuming systems 40. That is, each of first electronics channel 32 and second electronics channel 34 measures pressure of an oncoming airflow via a plurality of pressure sensing ports of second MFP 12B. First electronics channel 32 generates local air data parameters (i.e., local to second MFP 12B) based on the measured pressures. Static pressure data corresponding to static pressure measured by second static pressure sensor 14B is communicated to first electronics channel 32 of second MFP 12B. First electronics channel 32 compensates (e.g., modifies) the generated local air data parameters based on functional relationships between static pressure data received from static pressure sensor 14B (or, in certain examples, aircraft angle of sideslip) and the generated local air data parameters to generate compensated aircraft air data parameters. Compensated aircraft air data parameters generated by first electronics channel 32 of second MFP 12B are provided to consuming systems 40.

Second electronics channel 30 of first MFP 12A that is electrically coupled with second electronics channel 34 of second MFP 12B forms a third air data system that provides third aircraft air data parameter outputs to consuming systems 40. In some examples, one of second electronics channel 30 and second electronics channel 34 is designated as a primary channel and the remaining one of second electronics channel 30 and second electronics channel 34 is designated as a secondary channel of the third air data system. The designated primary channel generates and outputs the third aircraft air data parameter outputs to consuming systems 40 that are compensated based on static pressure data received from the designated secondary channel. That is, the designated secondary channel transmits measured static pressure data to the designated primary channel. The designated primary channel generates local air data parameters based on a plurality of measured pressures and compensates the local air data parameters based on the static pressure data received from the secondary channel (or, in certain examples, based on aircraft angle of sideslip determined as a function of the static pressure data received from the secondary channel) to generate the third aircraft air data parameter outputs.

As an example, second electronics channel 30 of first MFP 12A can be designated as a primary channel of the third air data system and second electronics channel 34 of second MFP 12B can be designated as a secondary channel of the third air data system. In such an example, second electronics channel 34 transmits static pressure data corresponding to static pressure of the oncoming airflow about the exterior of aircraft 10 measured by pressure sensors of second electronics channel 34 via pressure sensing ports of second MFP 12B. Second electronics channel 30 of first MFP 12A generates local air data parameters based on measured pressures of the oncoming airflow sensed by pressure sensors of second electronics channel 30 via pressure sensing ports of first MFP 12A. Second electronics channel 30 compensates the generated local air data parameters based on the static pressure data received from second electronics channel 34 of second MFP 12B. In other examples, second electronics channel 34 can be designated as a primary channel of the third air data system and second electronics channel 30 can be designates as the secondary channel.

In some examples, the designated primary channel can transition to be the primary channel of the third air data system to provide the third aircraft air data parameter outputs and the designated primary channel can transition to be the secondary channel of the third air data system. For example, the designated primary channel and the designated secondary channel can transition in response to a state transition command received from, e.g., any one or more of consuming systems 40. In some examples, the designated primary channel and the designated secondary channel can transition in response to a state transition condition determined by, e.g., one or more of the designate primary channel and the designated secondary channel. For instance, one or more of the designated primary channel and the designated secondary channel can determine a failure mode or other degraded condition of the designated primary channel and can initiate the state transition in response. Accordingly, transition of the designated primary channel to secondary state and the designated secondary channel to primary state can increase availability of the third aircraft air data parameter outputs in the event of, e.g., an identified failure mode of the primary channel.

The first aircraft air data parameter outputs, the second aircraft air data parameter outputs, and the third aircraft air data parameter outputs can include the same air data parameters. As such, rather than require three or more MFPs to provide three redundant sets of air data parameters, an air data system architecture implementing techniques described herein provides three redundant sets of compensated aircraft air data parameter outputs from three independent air data systems utilizing only two MFPs and two static pressure sensors. Moreover, the optional transition of second electronics channel 30 and second electronics channel 34 from primary to secondary channel (and vice versa) further enhances availability of the air data parameter outputs, thereby increasing overall system reliability.

Figure 3:
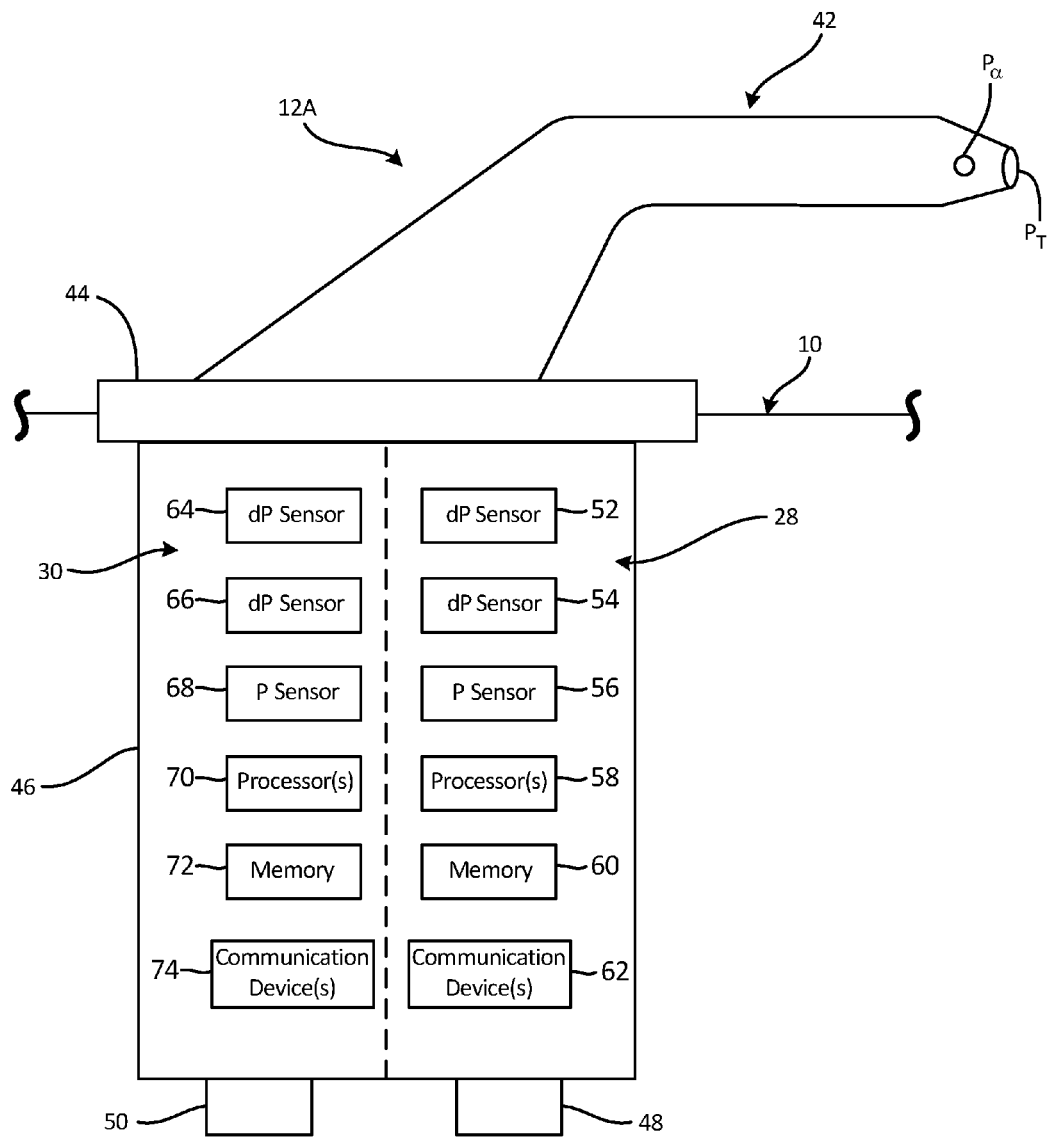
FIG. 3 is a schematic cross-sectional view of a dual-channel multi-function probe.

FIG. 3 is a schematic cross-sectional view of first MFP 12A. Though described with respect to first MFP 12A, it should be understood that techniques of the example of FIG. 3 are also applicable to second MFP 12B.

As illustrated in FIG. 3, first MFP 12A includes barrel portion 42, mounting plate 44, electronics housing 46, first electronics interface connector 48, and second electronics interface connector 50. Total pressure sensing port $P_T$ and alpha pressure sensing port $P_\alpha$ are disposed in barrel portion 42. Though not illustrated, a second alpha sensing port is disposed in barrel portion 42 opposite alpha pressure sensing port $P_\alpha$. Electronics housing 46 encloses first electronics channel 28 and second electronics channel 30. First electronics channel 28 includes differential pressure sensor 52, differential pressure sensor 54, absolute pressure sensor 56, one or more processors 58, computer-readable memory 60, and one or more communication devices 62. Second electronics channel 30 includes differential pressure sensor 64, differential pressure sensor 66, absolute pressure sensor 68, one or more processors 70, computer-readable memory 72, and one or more communication devices 74.

Mounting plate 44 is configured to mount first MFP 12A to aircraft 10 such that barrel portion 42 is disposed externally to aircraft 10 and extends into an oncoming airflow about the exterior of aircraft 10. Electronics housing 46 extends axially from mounting plate 44 within the interior of aircraft 10. First electronics interface connector 48 and second electronics interface connector 50 each extend axially from electronics housing 46 and are each configured to mate with an electronics communications data bus or other electrical connection. Total pressure sensing port $P_T$ and alpha pressure sensing port $P_\alpha$ are each pneumatically connected via a manifold or other pneumatic connection (not illustrated) to each of differential pressure sensor 52 and differential pressure sensor 64. Alpha pressure sensing port $P_\alpha$ as well as the opposite alpha pressure sensing port (not illustrated) are each pneumatically connected to both differential pressure sensor 54 and differential pressure sensor 66. In addition, alpha pressure sensing port $P_\alpha$ is pneumatically connected to each of pressure sensor 56 and pressure sensor 68 (i.e., absolute pressure sensors). Though pressure sensors 52, 54, 64, and 66 are described herein as differential pressure sensors, in some examples, any one or more of differential pressure sensors 52, 54, 64, and 66 can be implemented as two absolute pressure sensors, the difference between the two measured absolute pressures determined via, e.g., processor 58 and/or processor 70.

Examples of processors 58 and 70 can include any one or more of a microprocessor, a controller, a digital signal processor (DSP), an application specific integrated circuit (ASIC), a field-programmable gate array (FPGA), or other equivalent discrete or integrated logic circuitry. Computer-readable memory 60 and 72 can be configured to store information within first electronics channel 28 and second electronics channel 30 during operation. Computer-readable memory, in some examples, is described as a computer-readable storage medium. In certain examples, a computer-readable storage medium can include a non-transitory medium. The term "non-transitory" can indicate that the storage medium is not embodied in a carrier wave or a propagated signal. In some examples, a non-transitory storage medium can store data that can, over time, change (e.g., in RAM or cache). Computer-readable memory can include volatile memory, non-volatile memory, or both. Examples of volatile memories can include random access memories (RAM), dynamic random access memories (DRAM), static random access memories (SRAM), and other forms of volatile memories. Examples of non-volatile memories can include flash memories, forms of electrically programmable memories (EPROM) or electrically erasable and programmable (EEPROM) memories, magnetic hard discs, optical discs, floppy discs, or other forms of non-volatile memories.

First electronics channel 28 and second electronics channel 30 utilize communication device 62 and communication device 74, respectively, to communicate with external devices via first electronics interface connector 48 and second electronics interface connector 50. For example, communication devices 62 and 74 can be network interface cards (or other interface devices) configured to send and receive data over a communications network and/or data bus according to one or more communications protocols, such as the ARINC 429 communication protocol, CAN bus communication protocol, MIL-STD-1553 communication protocol, or other communication protocol.

Circuitry and processor-executable instructions (e.g., stored at computer-readable memory 60 and 72) can be dissimilar between first electronics channel 28 and second electronics channel 30. Dissimilarity between first electronics channel 28 and second electronics channel 30 can be achieved by, e.g., utilizing different components (e.g., different processors from different manufacturers) and/or different processor-executable instructions (e.g., different software or firmware developed by different development teams). As an example, processors 58 and 70 can be different processors or controllers provided by different chip manufacturers. Similarly, computer-readable memory 60 can be of a different type and/or provided by a different manufacturer than that of computer-readable memory 72. Communication devices 62 and 74 can be, e.g., ARINC 429 interfaces provided by different manufacturers or different types of interface devices (e.g., an ARINC 429 interface and a MIL-STD-1553). In general, as the degree of dissimilarity between first electronics channel 28 and second electronics channel 30 increases, the probability of occurrence of a common mode error decreases.

In operation, first electronics channel 28 and second electronics channel 30 utilize differential pressure sensors 52 and 64 (measuring differential pressure corresponding to impact pressure), differential pressure sensors 54 and 66 (measuring differential pressure corresponding to angle of attack), and pressure sensors 56 and 68 (measuring absolute pressure corresponding to local static pressure) to sense pressures of the oncoming airflow about the exterior of aircraft 10 and generate local air data parameters including, e.g., local static pressure, local calculated airspeed, local Mach number, local pressure altitude, and local angle of attack, as is known in the art.

First electronics channel 28 receives static pressure data corresponding to static pressure measured by static pressure sensor 14A via first electronics interface connector 48 and communication device 62. Processor 58 accesses functional mappings stored at computer-readable memory 60 to compensate the local air data parameters determined by first electronics channel 28 (based on pressure measurements from differential pressure sensor 52, differential pressure sensor 54, and pressure sensor 56) and generate compensated first air data parameter outputs. First electronics channel 28 outputs the compensated first air data parameter outputs to consuming systems 40 (FIG. 2) via communication device 62 and first electronics interface connector 48. It should be understood that first electronics channel 32 of second MFP 12B that is electrically connected to second static pressure sensor 14B (FIG. 2) performs similar operations to generate and output compensated second air data parameter outputs to consuming systems 40.

Second electronics channel 30, configured in this example as a primary channel of the third air data system, receives static pressure data corresponding to static pressure measured by second electronics channel 34 of second MFP 12B. Processor 70 accesses functional mappings stored at computer-readable memory 72 to compensate the local air data parameters determined by second electronics channel 30 (based on pressure measurements from differential pressure sensor 64, differential pressure sensor 66, and pressure sensor 68) and generate compensated third air data parameter outputs. Second electronics channel 30 outputs the compensated third air data parameter outputs to consuming systems 40 via communication device 74 and second electronics interface connector 50.

Accordingly, an air data system architecture implementing techniques of this disclosure includes two dual-channel MFPs and two static pressure sensors that are digitally interconnected to form three independent air data systems providing three sets of air data parameter outputs that are compensated for aircraft sideslip conditions. The techniques can help to reduce the cost, weight, and space of the air data system components as compared with architectures utilizing three or more MFPs for data redundancy, independence, and dissimilarity. Availability of air data parameter outputs is enhanced by an optional reversionary mode of the two dual-channel MFPs, thereby further increasing system reliability.

The following are non-exclusive descriptions of possible embodiments of the present invention.

A system includes a first multi-function probe (MFP) including a first plurality of pressure sensing ports for sensing pressure of an oncoming airflow about an aircraft exterior, a first static pressure sensor configured to sense static pressure of the oncoming airflow about the aircraft exterior, a second MFP including a second plurality of pressure sensing ports for sensing pressure of the oncoming airflow about the aircraft exterior, and a second static pressure sensor configured to sense the static pressure of the oncoming airflow about the aircraft exterior. The first MFP has a first electronics channel and a second electronics channel. The first static pressure sensor is electrically coupled with the first electronics channel of the first MFP to form a first air data system providing first aircraft air data parameter outputs. The second MFP has a first electronics channel and a second electronics channel. The second static pressure sensor is electrically coupled with the first electronics channel of the second MFP to form a second air data system providing second aircraft air data parameter outputs. The second electronics channel of the first MFP is electrically coupled with the second electronics channel of the second MFP to form a third air data system providing third aircraft air data parameter outputs.

The system of the preceding paragraph can optionally include, additionally and/or alternatively, any one or more of the following features, configurations and/or additional components:

The first MFP and the second static pressure sensor can be positioned at a first side of the aircraft. The second MFP and the first static pressure sensor can be positioned at a second side of the aircraft opposite the first side.

Each of the first MFP and the second MFP can include a barrel portion configured to extend into the oncoming airflow about the aircraft exterior. The first plurality of pressure sensing ports can be disposed on the barrel portion of the first MFP. The second plurality of pressure sensing ports can be disposed on the barrel portion of the second MFP.

Each of the first plurality of pressure sensing ports of the first MFP and the second plurality of pressure sensing ports of the second MFP can include: a total pressure sensing port disposed at a forward tip of the respective barrel portion; a first alpha pressure sensing port disposed aft of the forward tip at a top side of the respective barrel portion; and a second alpha pressure sensing port disposed aft of the forward tip at a bottom side of the respective barrel portion opposite the top side.

Each of the first static pressure sensor and the second static pressure sensor can be flush static pressure sensors configured to be mounted parallel to the aircraft exterior.

The first electronics channel of the first MFP can be configured to compensate the first aircraft air data parameter outputs based on static pressure data received from the first static pressure sensor. The first electronics channel of the second MFP can be configured to compensate the second aircraft air data parameter outputs based on static pressure data received from the second static pressure sensor.

The first electronics channel of the first MFP can be configured to determine an aircraft angle of sideslip based on the static pressure data received from the first static pressure sensor and to compensate the first aircraft air data parameter outputs based on the determined aircraft angle of sideslip. The first electronics channel of the second MFP can be configured to determine the aircraft angle of sideslip based on the static pressure date received from the second static pressure sensor and to compensate the second aircraft air data parameter outputs based on the determined aircraft angle of sideslip.

The second electronics channel of the first MFP can be configured as a primary channel of the third air data system to provide the third aircraft air data parameter outputs and the second electronics channel of the second MFP can be configured as a secondary channel of the third air data system to provide static pressure data to the second electronics channel of the first MFP. The second electronics channel of the first MFP can be configured to compensate the third aircraft air data parameter outputs based on static pressure data received from the second electronics channel of the second MFP.

The second electronics channel of the first MFP can be configured to determine an aircraft angle of sideslip based on the static pressure data received from the second electronics channel of the second MFP and to compensate the third aircraft air data parameter outputs based on the determined aircraft angle of sideslip.

The second electronics channel of the second MFP can be configured to transition to be the primary channel of the third air data system to provide the third aircraft air data parameter outputs and the second electronics channel of the first MFP can be configured to transition to be the secondary channel of the third air data system to provide static pressure data to the second electronics channel of the second MFP.

The second electronics channel of the first MFP can be configured to transition to be the primary channel of the third air data system in response to a state transition command received from a remote computing device electrically coupled with each of the second electronics channel of the first MFP and the second electronics channel of the second MFP. The second electronics channel of the second MFP can be configured to transition to be the secondary channel of the third air data system in response to the state transition command received from the remote computing device.

Each of the first aircraft air data parameter outputs, the second aircraft air data parameter outputs, and the third aircraft air data parameter outputs can include at least one of an aircraft angle of attack, an aircraft calibrated airspeed, an aircraft Mach number, an aircraft altitude, and an aircraft angle of sideslip.

Two or more of the first air data system, the second air data system, and the third air data system can be independent from one another.

Two or more of the first air data system, the second air data system, and the third air data system can be dissimilar from one another.

The second electronics channel of the first MFP can be directly electrically coupled with the second electronics channel of the second MFP to form the third air data system providing the third aircraft air data parameter outputs.

A system includes a first air data system configured to provide first aircraft air data parameter outputs, a second air data system configured to provide second aircraft air data parameter outputs, and a third air data system configured to provide third aircraft air data parameter outputs. The first air data system includes a first electronics channel of a first multi-function probe (MFP) having a first plurality of pressure sensing ports for sensing pressure of an oncoming airflow about an aircraft exterior. The first air data system further includes a first flush static pressure sensor configured to be mounted parallel to the aircraft exterior to sense static pressure of the oncoming airflow about the aircraft exterior. The second air data system includes a first electronics channel of a second MFP having a second plurality of pressure sensing ports for sensing pressure of the oncoming airflow about the aircraft exterior. The second air data system further includes a second flush static pressure sensor configured to be mounted parallel to the aircraft exterior to sense the static pressure of the oncoming airflow about the aircraft exterior. The third air data system includes a second electronics channel of the first MFP and a second electronics channel of the second MFP.

The system of the preceding paragraph can optionally include, additionally and/or alternatively, any one or more of the following features, configurations and/or additional components:

The first electronics channel of the first MFP can be electrically coupled with the first flush static pressure sensor to receive static pressure data sensed by the first flush static pressure sensor. The first electronics channel of the second MFP can be electrically coupled with the second flush static pressure sensor to receive static pressure data sensed by the second flush static pressure sensor. The second electronics channel of the first MFP can be electrically coupled with the second electronics channel of the second MFP to receive static pressure data sensed by the second MFP.

Each of the first MFP and the second MFP can include a barrel portion configured to extend into the oncoming airflow about the aircraft exterior. The first plurality of pressure sensing ports can be disposed on the barrel portion of the first MFP. The second plurality of pressure sensing ports can be disposed on the barrel portion of the second MFP. The first MFP and the second flush static pressure sensor can be positioned at a first side of the aircraft. The second MFP and first flush static pressure sensor can be positioned at a second side of the aircraft opposite the first side.

Two or more of the first air data system, the second air data system, and the third air data system can be independent from one another.

Two or more of the first air data system, the second air data system, and the third air data system can be dissimilar from one another.

A method includes generating first air data parameter outputs from a first electronics channel of a first multi-function probe (MFP) based on pressure of an oncoming airflow about an aircraft exterior sensed by the first MFP and a first static pressure sensor. The method further includes generating second air data parameter outputs from a first electronics channel of a second MFP based on pressure of the oncoming airflow about the aircraft exterior sensed by the second MFP and a second static pressure sensor. The method further includes generating third air data parameter outputs from a second electronics channel of the first MFP based on pressure of the oncoming airflow about the aircraft exterior sensed by the first MFP and the second MFP.

The method of the preceding paragraph can optionally include, additionally and/or alternatively, any one or more of the following features, configurations, operations and/or additional components:

Each of the first MFP and the second MFP can include a barrel portion configured to extend into the oncoming airflow about the aircraft exterior, the barrel portion of each of the first MFP and the second MFP including a plurality of pressure sensing ports configured to sense the pressure of the oncoming airflow. Each of the first static pressure sensor and the second static pressure sensor can be flush static pressure sensors configured to be mounted parallel to the aircraft exterior. The first MFP and the second static pressure sensor can be positioned at a first side of the aircraft. The second MFP and the first static pressure sensor can be positioned at a second side of the aircraft opposite the first side.

The first electronics channel of the first MFP and the first static pressure sensor can be electrically connected to form a first air data system. The first electronics channel of the second MFP and the second static pressure sensor can be electrically connected to form a second air data system. The second electronics channel of the first MFP and the second electronics channel of the second MFP can be electrically connected to form a third air data system. Two or more of the first air data system, the second are data system, and the third air data system can be independent and dissimilar from one another.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a first multi-function probe (MFP) comprising a first plurality of pressure sensing ports for sensing pressure of an oncoming airflow about an aircraft exterior, the first MFP having a first electronics channel and a second electronics channel;
   a first static pressure sensor configured to sense static pressure of the oncoming airflow about the aircraft exterior and electrically coupled with the first electronics channel of the first MFP to form a first air data system providing first aircraft air data parameter outputs;
   a second MFP comprising a second plurality of pressure sensing ports for sensing the pressure of the oncoming airflow about the aircraft exterior, the second MFP having a first electronics channel and a second electronics channel; and
   a second static pressure sensor configured to sense the static pressure of the oncoming airflow about the aircraft exterior and electrically coupled with the first electronics channel of the second MFP to form a second air data system providing second aircraft air data parameter outputs;
   wherein the second electronics channel of the first MFP is electrically coupled with the second electronics channel of the second MFP to form a third air data system providing third aircraft air data parameter outputs.

2. The system of claim 1,
   wherein the first MFP and the second static pressure sensor are positioned at a first side of the aircraft; and
   wherein the second MFP and the first static pressure sensor are positioned at a second side of the aircraft opposite the first side.

3. The system of claim 1,
   wherein each of the first MFP and the second MFP comprise a barrel portion configured to extend into the oncoming airflow about the aircraft exterior;
   wherein the first plurality of pressure sensing ports is disposed on the barrel portion of the first MFP; and
   wherein the second plurality of pressure sensing ports is disposed on the barrel portion of the second MFP.

4. The system of claim 3,
   wherein each of the first plurality of pressure sensing ports of the first MFP and the second plurality of pressure sensing ports of the second MFP comprise:
   a total pressure sensing port disposed at a forward tip of the respective barrel portion;
   a first alpha pressure sensing port disposed aft of the forward tip at a top side of the respective barrel portion; and
   a second alpha pressure sensing port disposed aft of the forward tip at a bottom side of the respective barrel portion opposite the top side.

5. The system of claim 1,
   wherein each of the first static pressure sensor and the second static pressure sensor are flush static pressure sensors configured to be mounted parallel to the aircraft exterior.

6. The system of claim 1,
   wherein the first electronics channel of the first MFP is configured to compensate the first aircraft air data parameter outputs based on static pressure data received from the first static pressure sensor; and wherein the first electronics channel of the second MFP is configured to compensate the second aircraft air data parameter outputs based on static pressure data received from the second static pressure sensor.

7. The system of claim 6, wherein the first electronics channel of the first MFP is configured to determine an aircraft angle of sideslip based on the static pressure data received from the first static pressure sensor and to compensate the first aircraft air data parameter outputs based on the determined aircraft angle of sideslip; and wherein the first electronics channel of the second MFP is configured to determine the aircraft angle of sideslip based on the static pressure date received from the second static pressure sensor and to compensate the second aircraft air data parameter outputs based on the determined aircraft angle of sideslip.

8. The system of claim 1, wherein the second electronics channel of the first MFP is configured as a primary channel of the third air data system to provide the third aircraft air data parameter outputs and the second electronics channel of the second MFP is configured as a secondary channel of the third air data system to provide static pressure data to the second electronics channel of the first MFP; and wherein the second electronics channel of the first MFP is configured to compensate the third aircraft air data parameter outputs based on static pressure data received from the second electronics channel of the second MFP.

9. The system of claim 8, wherein the second electronics channel of the first MFP is configured to determine an aircraft angle of sideslip based on the static pressure data received from the second electronics channel of the second MFP and to compensate the third aircraft air data parameter outputs based on the determined aircraft angle of sideslip.

10. The system of claim 8, wherein the second electronics channel of the second MFP is configured to transition to be the primary channel of the third air data system to provide the third aircraft air data parameter outputs and the second electronics channel of the first MFP is configured to transition to be the secondary channel of the third air data system to provide static pressure data to the second electronics channel of the second MFP.

11. The system of claim 10, wherein the second electronics channel of the first MFP is configured to transition to be the primary channel of the third air data system in response to a state transition command received from a remote computing device electrically coupled with each of the second electronics channel of the first MFP and the second electronics channel of the second MFP; and wherein the second electronics channel of the second MFP is configured to transition to be the secondary channel of the third air data system in response to the state transition command received from the remote computing device.

12. The system of claim 1, wherein each of the first aircraft air data parameter outputs, the second aircraft air data parameter outputs, and the third aircraft air data parameter outputs include at least one of an aircraft angle of attack, an aircraft calibrated airspeed, an aircraft Mach number, an aircraft altitude, and an aircraft angle of sideslip.

13. The system of claim 1, wherein two or more of the first air data system, the second air data system, and the third air data system are independent from one another.

14. The system of claim 1, wherein two or more of the first air data system, the second air data system, and the third air data system are dissimilar from one another.

15. The system of claim 1, wherein the second electronics channel of the first MFP is directly electrically coupled with the second electronics channel of the second MFP to form the third air data system providing the third aircraft air data parameter outputs.

16. A system comprising:

a first air data system configured to provide first aircraft air data parameter outputs, the first air data system comprising:
  a first electronics channel of a first multi-function probe (MFP) having a first plurality of pressure sensing ports for sensing pressure of an oncoming airflow about an aircraft exterior; and
  a first flush static pressure sensor configured to be mounted parallel to the aircraft exterior to sense static pressure of the oncoming airflow about the aircraft exterior;

a second air data system configured to provide second aircraft air data parameter outputs, the second air data system comprising:
  a first electronics channel of a second MFP having a second plurality of pressure sensing ports for sensing pressure of the oncoming airflow about the aircraft exterior; and
  a second flush static pressure sensor configured to be mounted parallel to the aircraft exterior to sense the static pressure of the oncoming airflow about the aircraft exterior; and a third air data system configured to provide third aircraft air data parameter outputs, the third air data system comprising:
  a second electronics channel of the first MFP; and
  a second electronics channel of the second MFP.

17. The system of claim 16, wherein the first electronics channel of the first MFP is electrically coupled with the first flush static pressure sensor to receive static pressure data sensed by the first flush static pressure sensor;

wherein the first electronics channel of the second MFP is electrically coupled with the second flush static pressure sensor to receive static pressure data sensed by the second flush static pressure sensor; and wherein the second electronics channel of the first MFP is electrically coupled with the second electronics channel of the second MFP to receive static pressure data sensed by the second MFP.

18. The system of claim 16, wherein each of the first MFP and the second MFP comprise a barrel portion configured to extend into the oncoming airflow about the aircraft exterior;

wherein the first plurality of pressure sensing ports is disposed on the barrel portion of the first MFP;

wherein the second plurality of pressure sensing ports is disposed on the barrel portion of the second MFP;

wherein the first MFP and the second flush static pressure sensor are positioned at a first side of the aircraft; and wherein the second MFP and first flush static pressure sensor are positioned at a second side of the aircraft opposite the first side.

19. A method comprising:

generating first air data parameter outputs from a first electronics channel of a first multi-function probe (MFP) based on pressure of an oncoming airflow about an aircraft exterior sensed by the first MFP and a first static pressure sensor;

generating second air data parameter outputs from a first electronics channel of a second MFP based on pressure of the oncoming airflow about the aircraft exterior sensed by the second MFP and a second static pressure sensor; and generating third air data parameter outputs from a second electronics channel of the first MFP based on pressure of the oncoming airflow about the aircraft exterior sensed by the first MFP and the second MFP.

20. The method of claim 19, wherein the first electronics channel of the first MFP and the first static pressure sensor are electrically connected to form a first air data system;

wherein the first electronics channel of the second MFP and the second static pressure sensor are electrically connected to form a second air data system;

wherein the second electronics channel of the first MFP and the second electronics channel of the second MFP are electrically connected to form a third air data system; and wherein two or more of the first air data system, the second air data system, and the third air data system are independent and dissimilar from one another.

* * * * *